United States Patent
Kim et al.

(10) Patent No.: US 9,585,081 B2
(45) Date of Patent: Feb. 28, 2017

(54) METHOD FOR CONNECTING IMS-BASED SERVICE

(71) Applicant: LG Electronics Inc., Seoul (KR)

(72) Inventors: Jaehyun Kim, Seoul (KR); Taehyeon Kim, Seoul (KR); Laeyoung Kim, Seoul (KR); Youngdae Lee, Seoul (KR); Hyunsook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 90 days.

(21) Appl. No.: 14/646,593

(22) PCT Filed: Nov. 27, 2013

(86) PCT No.: PCT/KR2013/010843
§ 371 (c)(1),
(2) Date: May 21, 2015

(87) PCT Pub. No.: WO2014/084596
PCT Pub. Date: Jun. 5, 2014

(65) Prior Publication Data
US 2015/0304937 A1    Oct. 22, 2015

Related U.S. Application Data

(60) Provisional application No. 61/730,057, filed on Nov. 27, 2012, provisional application No. 61/858,090, filed on Jul. 24, 2013.

(51) Int. Cl.
H04W 48/02    (2009.01)
H04W 48/14    (2009.01)
(Continued)

(52) U.S. Cl.
CPC ......... *H04W 48/02* (2013.01); *H04L 65/1006* (2013.01); *H04L 65/1016* (2013.01);
(Continued)

(58) Field of Classification Search
CPC .............................. H04L 47/10; H04L 47/30
See application file for complete search history.

(56) References Cited

U.S. PATENT DOCUMENTS

2007/0049342 A1*  3/2007  Mayer .................... H04M 1/04
                                                                     455/558
2009/0154408 A1   6/2009  Jeong et al.
(Continued)

FOREIGN PATENT DOCUMENTS

WO    2010141788    12/2010

*Primary Examiner* — Andrew Lai
*Assistant Examiner* — Zhiren Qin
(74) *Attorney, Agent, or Firm* — Dentons US LLP

(57) ABSTRACT

The present specification provides a method for connecting an IP multimedia subsystem (IMS)-based service in a terminal. The method for connecting the IMS-based service, includes the steps of: setting a cause value denoting signaling or due to the IMS in an establishment cause field, when a session initiation protocol (SIP)-based message is required to be transmitted on a user plane for connecting the IMS-based service; transmitting a service request message of a non-access stratum (NAS) layer including service type (field) denoting signaling or due to a base station; and transmitting a radio resource control (RRC) connection request message including the set establishment cause field to the base station.

10 Claims, 11 Drawing Sheets

(51) Int. Cl.
*H04W 68/02* (2009.01)
*H04W 80/10* (2009.01)
*H04L 29/06* (2006.01)

(52) U.S. Cl.
CPC ......... *H04L 65/1069* (2013.01); *H04W 48/14* (2013.01); *H04W 68/02* (2013.01); *H04W 80/10* (2013.01)

(56) References Cited

U.S. PATENT DOCUMENTS

| | | |
|---|---|---|
| 2009/0238143 A1 | 9/2009 | Mukherjee et al. |
| 2011/0002327 A1 | 1/2011 | Dwyer et al. |
| 2012/0269099 A1 | 10/2012 | Chin et al. |
| 2012/0321052 A1* | 12/2012 | Morrill ............. H04L 29/06027 379/32.01 |
| 2013/0044656 A1* | 2/2013 | Hsieh .................. H04L 12/1403 370/310 |
| 2013/0294396 A1* | 11/2013 | Iwamura ............... H04W 72/04 370/329 |

* cited by examiner

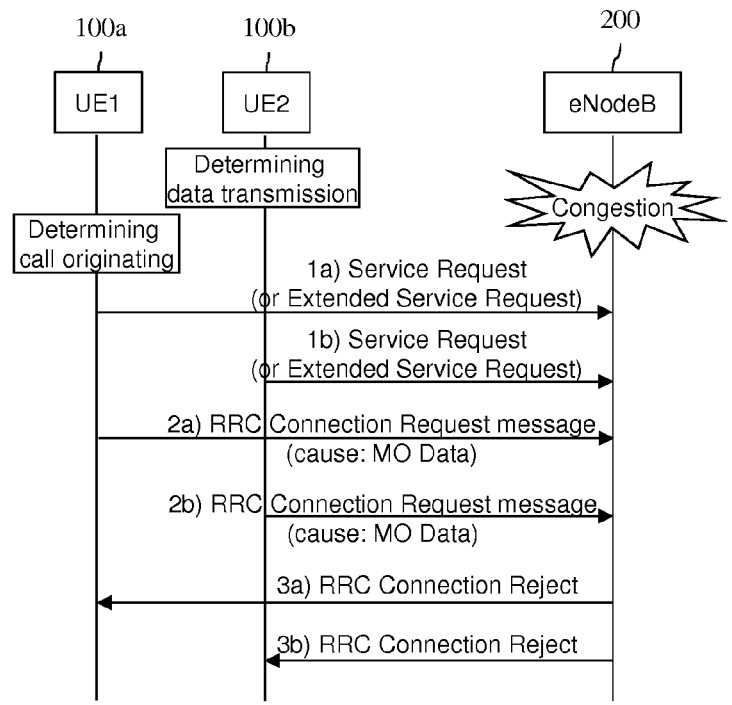
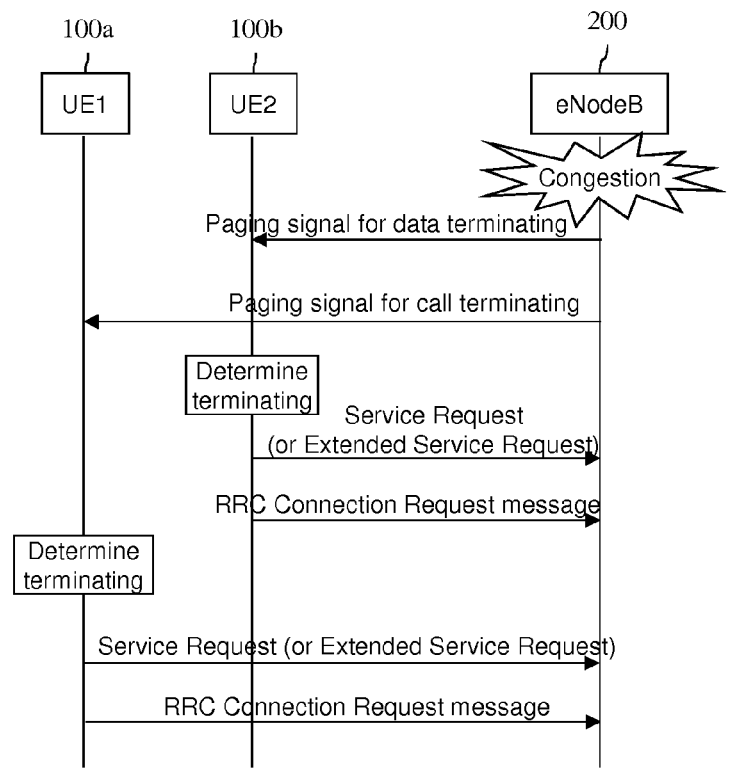

METHOD FOR CONNECTING IMS-BASED SERVICE

This application is a 35 USC §371 National Stage entry of International Application No. PCT/KR2013/010843 filed on Nov. 27, 2013, and claims priority to U.S. Provisional Application No. 61/730,057 filed on Nov. 27, 2012 and 61/858,090 filed on Jul. 24, 2013, all of which are hereby incorporated by reference in their entireties as if fully set forth herein.

BACKGROUND OF THE INVENTION

Field of the Invention

The present invention relates to a method of connecting an IP Multimedia Subsystem (IMS)-based service.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 Shows the Configuration of an Evolved Mobile Communication Network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
|---|---|
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |

TABLE 1-continued

| REFERENCE POINT | DESCRIPTION |
| --- | --- |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an Exemplary Diagram Showing the Architecture of a Common E-UTRAN and a Common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3a is an Exemplary Diagram Showing the Structure of a Radio Interface Protocol in a Control Plane Between UE and an eNodeB, and FIG. 3b is Another Exemplary Diagram Showing the Structure of a Radio Interface Protocol in a Control Plane Between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 3a are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

Several layers are present in the second layer.

First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3a is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 4a is a Flowchart Illustrating a Random Access Process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 4b Illustrates a Connection Process in a Radio Resource Control (RRC) Layer.

FIG. 4b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

The idle UE 10, when attempting to establish an RRC connection, e.g., for attempting to call or transmit data or responding to paging from eNodeB 20, sends an RRC connection request message to eNodeB 20.

When receiving the RRC connection message from UE 10, eNodeB 20 accepts the RRC connection request from UE 10 if there are enough radio resources, and eNodeB 20 sends a response message, RRC connection setup message, to UE 10.

When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

Meanwhile, when the UE 10 requests an RRC connection for the purpose of data transmission of a user plane, this can be rejected if a network, e.g., a base station (i.e., eNodeB) is in a congestion state. On the other hand, when the UE 10 requests the RRC connection for the purpose of transmitting a signal of a control plane for requesting a Circuit Switch (CS)-based call, this cannot be rejected even if the network, for example, the base station (i.e., eNodeB), is in the congestion state.

However, an IMS service (i.e., ALL IP service) such as Voice over LTE (VoLTE) uses a signal based on a Session Initiation Protocol (SIP) of an IP Multimedia Subsystem (IMS) as a control signal for transmitting and receiving a call. The SIP-based control signals are transmitted not on the control plane but on the user plane. Therefore, in a case where the UE 100 requests the RRC connection to transmit the SIP-based control signal in order to start the IMS service (i.e., ALL IP service) such as VoLTE, this can be rejected if the network, e.g., the base station (i.e., eNodeB) is in the congestion state.

Accordingly, there is a problem in that even the call is dropped in the network congestion state.

SUMMARY OF THE INVENTION

Accordingly, an aspect of the present specification provides a method for solving the aforementioned problem.

In order to achieve the aforementioned purpose, the present specification provides a method of connecting an IP Multimedia Subsystem (IMS)-based service in a terminal. The method may comprise: if there is a need to transmit a Session Initiation Protocol (SIP)-based message on a user plane to connect the IMS-based service, setting a cause value indicating signaling or indicating that it is caused by IMS into an establishment cause field; transmitting to a base station a service request or extended service request message of a Non-Access Stratum (NAS) layer including a service type (field) indicating signaling or indicating that it is caused by IMS; and transmitting to the base station a Radio Resource Control (RRC) connection request message including the set establishment cause field.

In the establishment cause field, the cause value which implies signaling or implies that it is caused by IMS may be set, instead of a cause value which implies a transmission of normal data.

The transmitting of the RRC connection request message may comprise: delivering, by a NAS layer of the terminal, the set cause value to an RRC layer of the terminal; setting, by the RRC layer of the terminal, a cause field of an RRC connection request message on the basis of the set cause value; and transmitting the RRC connection request message including the set cause field.

The IMS-based service may correspond to one of an IMS-based voice call service, video call service, and multimedia telephony service.

If the IMS-based service is initiated by the terminal, the cause value may correspond to any one of MO-signaling, an MO-IMS service, an MO-IMS access, an MO-IMS MMTEL service, and a new cause value.

In case of IMS-based terminating, a network delivers the message to the base station by including information for distinguishing this from normal data terminating.

A paging signal received from the base station may include a priority or information indicating whether the terminating is terminating based on the IMS-based service or terminating of the normal data.

The setting of the establishment cause field may comprise: checking the information included in the paging signal; and setting an MT-access on the basis of the checked information.

The method may further comprise: receiving information regarding cause values related to the IMS-based service from the base station, wherein in the setting of the establishment cause field, one of the cause values is selected.

The method may further comprise: receiving system information including access class barring information from the base station, wherein the access class barring information includes an exception rule for an IMS service: and determining whether to transmit the RRC connection request message according to the access class barring information. In the determining, if there is a need to transmit an IMS-based control signal or SIP-based message for connecting the IMS-based service, the RRC connection request message is transmitted according to the exception rule.

On the other hand, the present specification provides a terminal for connecting an IP Multimedia Subsystem (IMS)-based service. The terminal may comprise: a controller for, if there is a need to transmit an IMS-based control signal or a Session Initiation Protocol (SIP)-based message on a user plane to connect the IMS-based service, setting a cause value indicating signaling or indicating that it is caused by IMS to an establishment cause field; and a transceiver for transmitting to a base station under the control of the controller a service request or extended service request message of a Non-Access Stratum (NAS) layer including a service type (field) indicating signaling or indicating that it is caused by IMS, and for transmitting to the base station a Radio Resource Control (RRC) connection request message including the set establishment cause field.

Conventionally, if a UE requests an RRC connection to transmit an IMS-based control signal or an SIP-based control signal in order to start an IMS-based call (e.g., VoLTE), there is a problem in that a base station (i.e., eNodeB) in a congestion state cannot distinguish the IMS-based call and normal data, and even an RRC connection request for the IMS-based call is dropped together with an RRC connection request for the normal data.

However, according to an aspect of the present specification, such a problem is solved, thereby resolving user's inconvenience.

BRIEF DESCRIPTION OF THE DRAWINGS

FIG. 6a shows an example in which a UE rejects an RRC connection request in a congestion situation of an eNodeB shown in FIG. 5.

FIG. 6b shows a terminating situation of a UE in a congestion situation of an eNodeB shown in FIG. 5.

FIG. 8a shows an exemplary flow according to a first aspect of the present specification for solving a problem of FIG. 6a.

DESCRIPTION OF EXEMPLARY EMBODIMENTS

Figure 1:
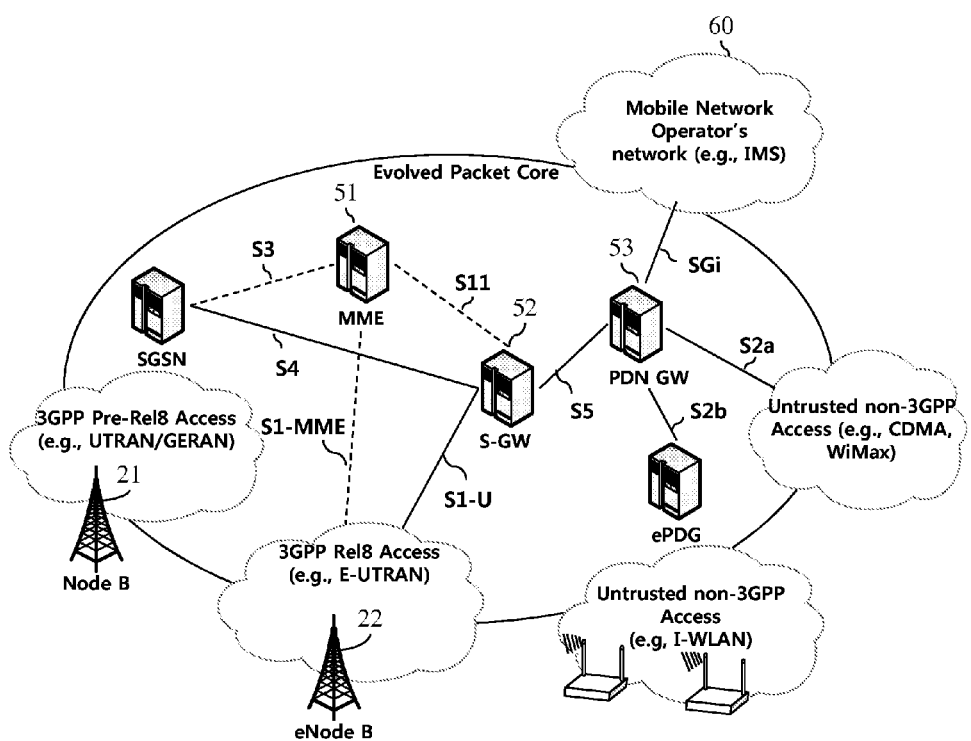
FIG. 1 shows the configuration of an evolved mobile communication network.
Figure 2:
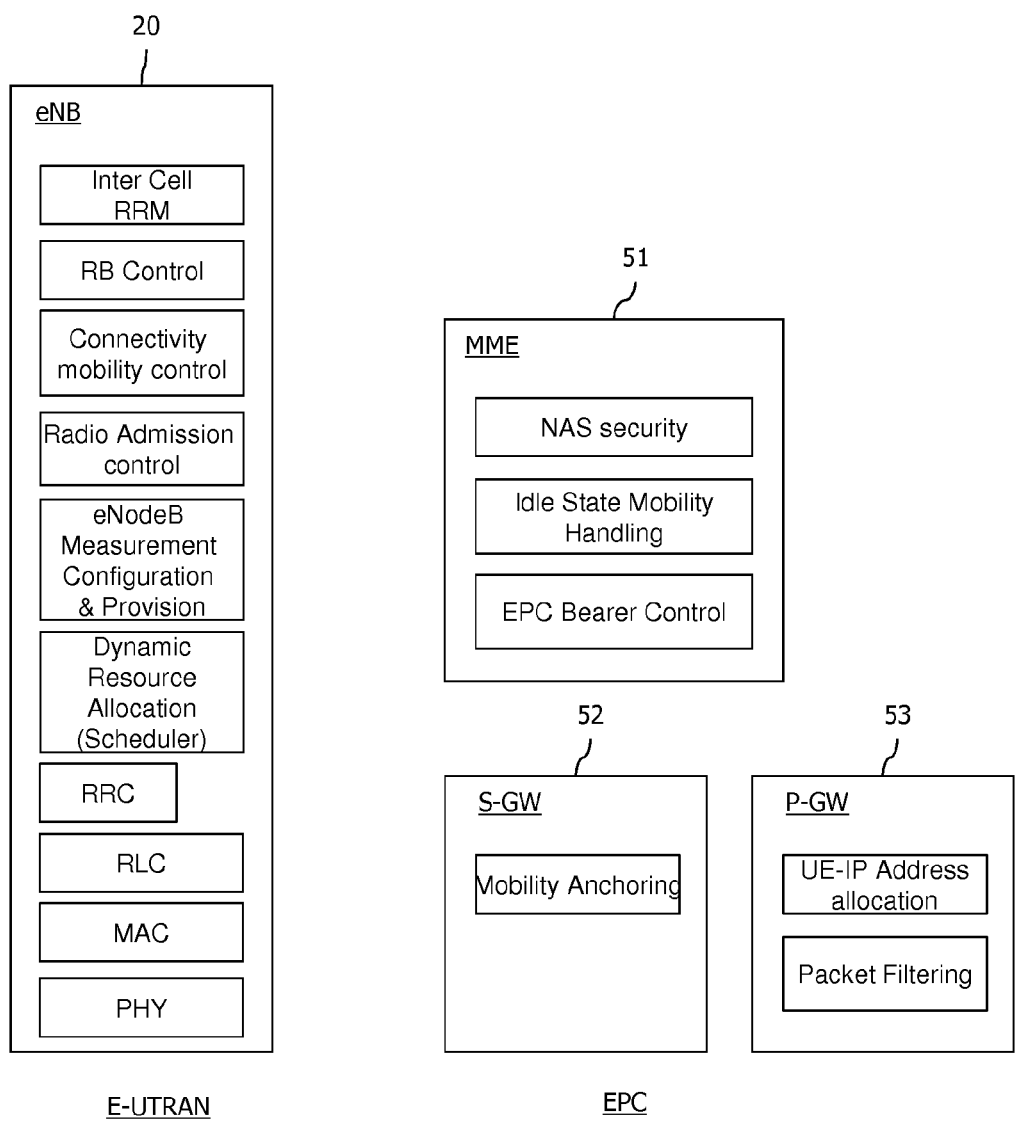
FIG. 2 is an exemplary diagram showing the architecture of a common E-UTRAN and a common EPC.
Figure 3A:
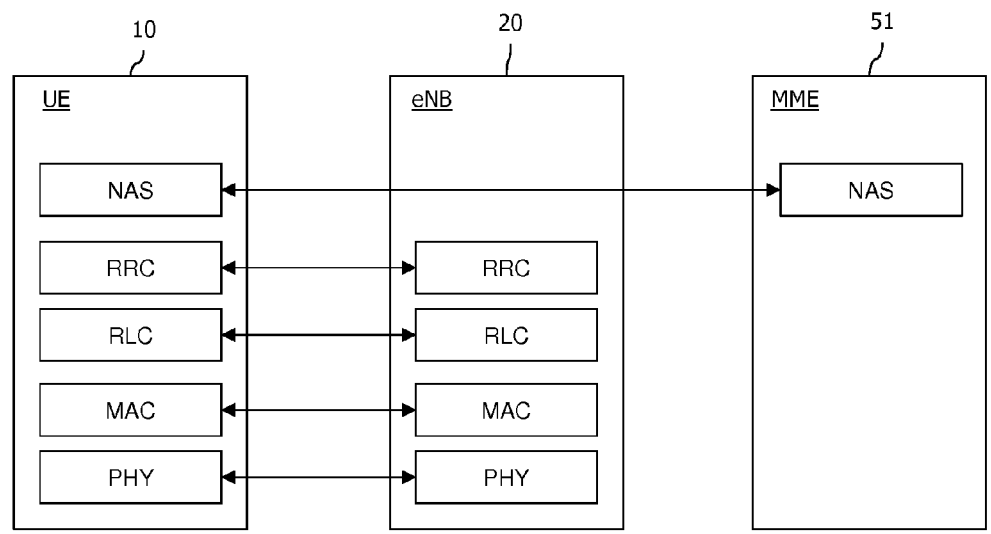
FIG. 3a is an exemplary diagram showing the structure of a radio interface protocol in a control plane between UE and an eNodeB.
Figure 3B:
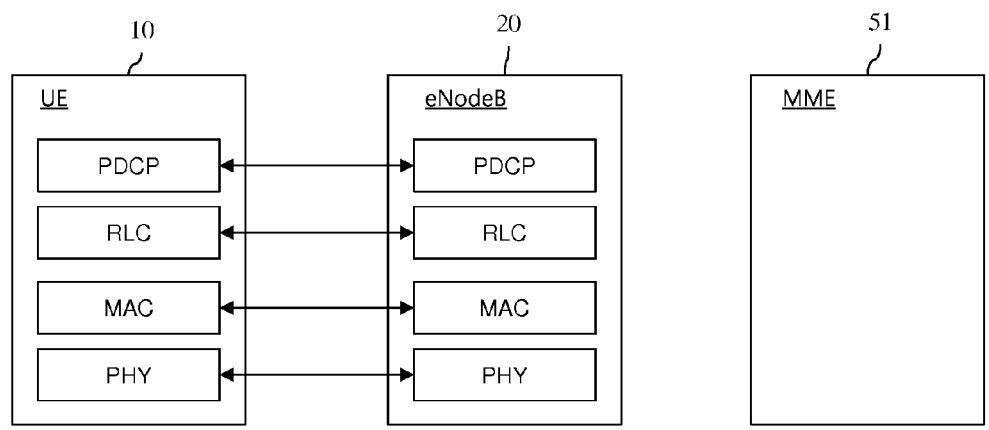
FIG. 3b is another exemplary diagram showing the structure of a radio interface protocol in a control plane between UE and an eNodeB
Figure 4A:
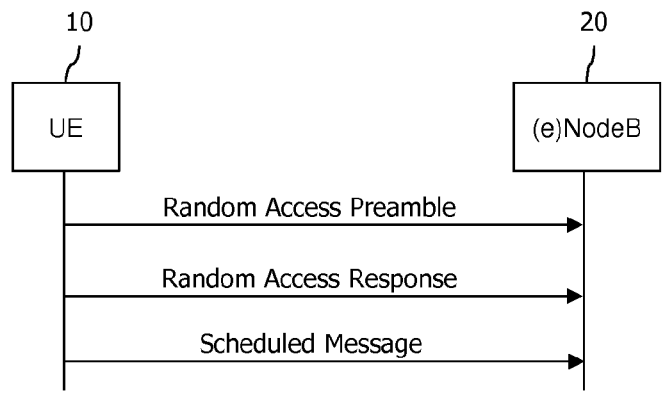
FIG. 4a is a flowchart illustrating a random access process in 3GPP LTE.
Figure 4B:
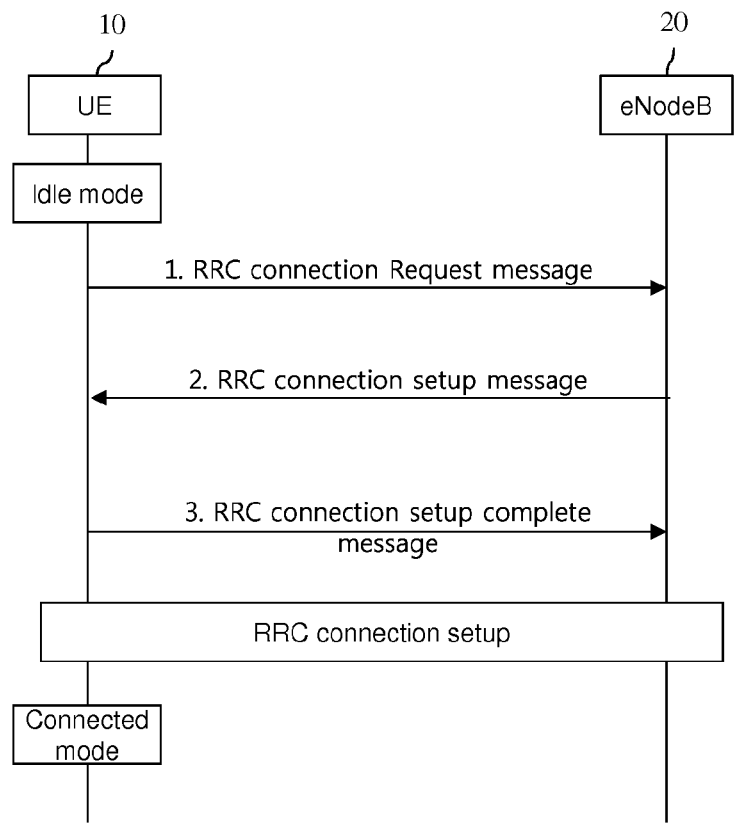
FIG. 4b illustrates a connection process in a Radio Resource Control (RRC) layer.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

UMTS: stands for Universal Mobile Telecommunication System and means a 3rd generation mobile communication network.

UE/MS: User Equipment/Mobile Station. Means a terminal device.

EPS: stands for Evolved Packet System and means a mobile communication system including a UE, an access network including LTE, and an EPC.

PDN (Public Data Network): an independent network in which a service providing server is located PDN connection: connection from UE to PDN, i.e., association (connection) between a UE represented with an IP address and a PDN represented with an APN (access point name)

PDN-GW (Packet Data Network Gateway): a network node of an EPS network performing functions such as UE IP address allocation, packet screening & filtering, and charging data collection Serving GW (Serving Gateway): a network node of an EPS network performing functions such as mobility anchor, packet routing, idle mode packet buffering, and triggering MME to page UE PCRF (Policy and Charging Rule Function): an EPS network node performing policy decision for dynamically applying QoSs and billing policies differentiated per service flow.

APN (Access Point Name): name of an access point managed by a network, provided from a UE, i.e., a character string for denoting a PDN or distinguishing a PDN from another. Accessing a requested service or network (PDN) gets through a corresponding P-GW, and an APN is a name (e.g., internet.mnc012.mcc345.gprs) pre-defined in the network to be able to discover the P-GW.

TEID (Tunnel Endpoint Identifier): End point ID of a tunnel configured between nodes in a network. A TEID is configured per section by the bearer of each UE.

NodeB: a UMTS network base station. A NodeB is installed outdoors and corresponds in cell coverage size to a macro cell.

eNodeB: an EPS (Evolved Packet System) base station and is installed outdoors. An eNodeB corresponds in cell coverage size to a macro cell.

(e)NodeB: collectively denotes NodeB and eNodeB

MME: stands for Mobility Management Entity and plays a role to control each entity in an EPS to provide mobility and session for a UE.

Session: a pathway for data transmission. The unit of session may include PDN, bearer, and IP flow which respectively correspond the unit of the overall target network (unit of APN or PDN), the unit distinguished by QoS therein (unit of bearer), and unit of destination IP address.

PDN connection: a connection from a UE to a PDN, i.e., an association (connection) between a UE represented with an IP address and a PDN represented with an APN. This means a connection (UE-PDN GW) between entities in a core network to form a session.

UE Context: information on UE's context used to manage UE in network, i.e., context information consisting of UE id, mobility (e.g., current location), and session attribute (QoS, or priority)

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameters associated with NAS functionality MTC: Machine Type Communication which is communication achieved between devices or between a device and a server without a human intervention.

MTC device: A UE which serves for a specific purpose having a communication function through a core network, for example, a vending machine, a meter reading device, a weather sensor, etc. The MTC device may be also referred to as an MTC terminal, an MTC apparatus, an MTC machine, an MTC UE, a UE user for MTC, a UE configured for MTC, etc.

MTC server: A server which manages the MTC device and exchanges data on a network. The server may exist outside the core network.

MTC application: An actual application using the MTC device and the MTC server (e.g., remote meter reading, product delivery tacking, etc.).

MTC feature: A function or feature of a network for supporting the application. That is, some features are required according to a usage of each application. Examples thereof include MTC monitoring (required for remote meter reading or the like for a lost device), a low mobility (almost no movement in case of the vending machine), small data transmission (only small amount of data is transmitted/received by the MTC device), etc.

MTC user: A user who uses a service provided by the MTC server.

NAS (Non-Access-Stratum): A higher stratum of a control plane between a UE and an MME. The NAS supports mobility management, session management, IP address management, etc., between the UE and the network.

MM (Mobility Management) operation/procedure: An operation or procedure for mobility regulation/management/ control of the UE. The MM operation/procedure may be interpreted as including one or more of an MM operation/ procedure in a CS network, a GMM operation/procedure in a GPRS network, and an EMM operation/procedure in an EPS network. The UE and the network node (e.g., MME, SGSN, and MSC) exchange an MM message to perform the MM operation/procedure.

SM (Session Management) operation/procedure: An operation or procedure for regulating/managing/processing/ handling a user plane and/or a bearer context/PDP context of the UE. The SM operation/procedure may be interpreted as including one or more of an SM operation/procedure in a GPRS network and an ESM operation/procedure in an EPS network. The UE and the network node (e.g., MME and SGSN) exchange an SM message to perform the SM operation/procedure.

Low priority UE: A UE configured for NAS signalling low priority. The standard document 3GPP TS 24.301 and TS 24.008 may be incorporated by reference for details thereof.

Normal priority UE: A normal UE not configured with low priority.

Dual priority UE: A UE configured for dual priority. That is, a UE which provides dual priority support is configured for a NAS signalling low priority and also configured to override the NAS signalling low priority indicator. The standard document 3GPP TS 24.301 and TS 24.008 may be incorporated by reference for details thereof.

Hereinafter, an aspect of the present specification is described with reference to the accompanying drawings.

Figure 5:
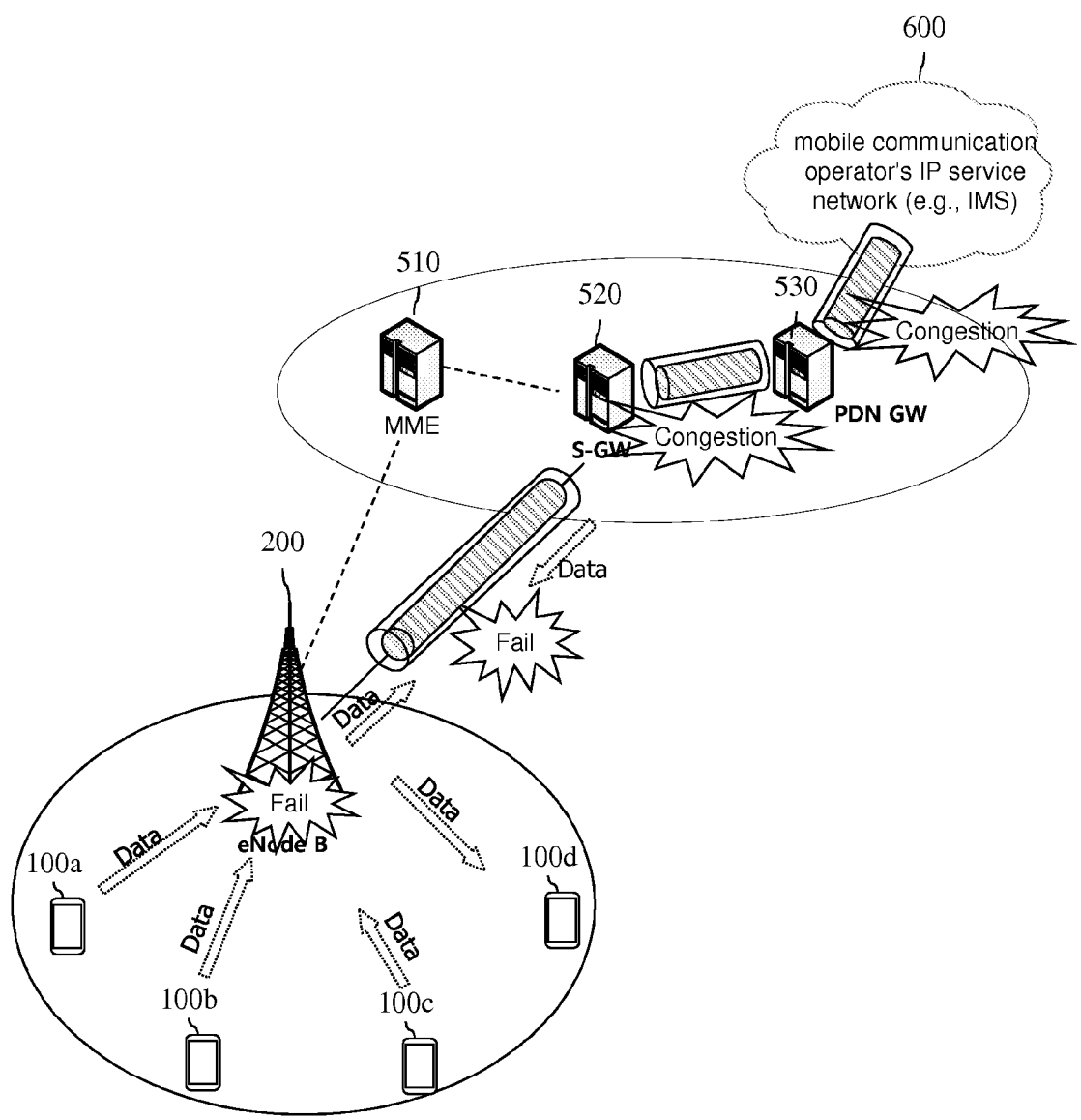
FIG. 5 shows a network overload state.

FIG. 5 shows a network overload state.

As shown in FIG. 5, many UEs 100a, 100b, 300c, and 300d are present in the coverage of an eNodeB 200, and data transmission/reception is attempted. Accordingly, if traffic is overloaded or congested in an interface between the eNodeB 200 and an S-GW 520, downlink data to the MTC device 100 or uplink data from the UE 100 is not correctly transmitted and thus data transmission fails.

Alternatively, even if an interface between the S-GW 520 and a PDN-GW 530 or an interface between the PDN-GW 530 and an Internet Protocol (IP) service network of a mobile communication operator is overloaded or congested, downlink data to the UEs 100a, 100b, 300c, and 300d or uplink data from the UEs 100a, 100b, 300c, and 300d is not correctly transmitted and thus data transmission fails.

If an interface between the eNodeB 200 and the S-GW 520 is overloaded or congested or if an interface between the S-GW 520 and the PDN-GW 530 is overloaded or congested, a node (e.g., MME) of the core network performs a NAS level congest control to avoid or control signaling congestion and APN congestion.

The NAS level congestion control consists of an APN based congestion control and a general NAS level mobility management control.

The APN based congestion control implies an EMM, GMM, and (E)SM signal congestion control related to a UE and a specific APN (i.e., an APN related to a congestion state), and includes an APN based session management congestion control and an APN based mobility management congestion control.

On the other hand, the general NAS level mobility management control implies that a node (MME, SGSN) in the core network rejects a mobility management signaling request which is requested by the UE/MS in a general network congestion or overload situation to avoid the congestion and the overload.

In general, if the core network performs the NAS level congestion control, a back-off timer value is transmitted to a UE in an idle mode or a connected mode by being carried on a NAS reject message. In this case, the UE does not request an EMM/GMM/(E)SM signal to the network until the back-off timer expires. The NAS reject message is one of an Attach reject, a Tracking Area Updating (TAU) reject, a Routing Area Updating (RAU) reject, a service reject, an extended service reject, a PDN connectivity reject, a bearer resource allocation reject, a bearer resource modification reject, and a deactivate EPS bearer context request reject.

The back-off timer may be classified into a Mobility Management (MM) back-off timer and a Session Management (SM) back-off timer.

The MM back-off timer operates independently for each UE, and the SM back-off timer operates independently for each APN and each UE.

Simply, the MM back-off timer is for controlling an EMM/GMM signal (e.g., Attach, TAU/RAU request, etc.). The SM back-off timer is for controlling an (E)SM signal (e.g., PDN connectivity, Bearer Resource Allocation, Bearer Modification, PDP Context Activation, PDP Context Modification request, etc.).

More specifically, the MM back-off timer is a mobility management related back-off timer used to control a case where a network congestion occurs, and is a timer which prevents the UE from performing an attach, location information update (TAU, RAU), and service request procedure during the timer is running. However, exceptionally in case of an emergency bearer service and a Multimedia Priority Service (MPS), the UE may be allowed to perform the request even if the timer is running.

As described above, the UE may receive the MM back-off timer value from a core network node (e.g., MME, SGSN, etc.) or from a lower layer (access stratum). In addition, the timer value may be randomly set by the UE within the range of 15 minutes to 30 minutes.

The SM back-off timer is a session management related back-off timer used to control a case where a network congestion occurs, and is a timer which prevents the UE from configuring or changing an associated APN-based session. However, likewise, exceptionally in case of an emergency bearer service and a Multimedia Priority Service (MPS), the UE 100 may be allowed to perform the request even if the timer is running.

The UE receives the SM back-off timer value from the core network node (e.g., MME, SGSN, etc.), and is randomly set within up to 72 hours. In addition, the timer value may be randomly set by the UE/MS within the range of 15 minutes to 30 minutes.

Meanwhile, if a congestion occurs in the eNodeB 200, the eNodeB 200 may also perform the congestion control. That is, in a case where the UE requests an RRC connection establishment for the purpose of data transmission of a user plane, if the eNodeB 200 is in the congestion state, a rejection response may be transmitted to the UE together with an extended wait timer. In this case, the RRC connection establishment request cannot be reattempted until the extended wait timer expires. On the other hand, in a case where the UE requests the RRC establishment for the purpose of transmitting a signal of a control plane for a Circuit Switched (CS)-based call, this cannot be rejected even if the eNodeB 200 is in the congestion state.

However, an ALL IP service such as Voice over LTE (VoLTE) uses a signal based on a Session Initiation Protocol (SIP) of an IP Multimedia Subsystem (IMS) as a control signal for call originating and terminating. The SIP-based control signals are transmitted not on the control plane but on the user plane. Therefore, in a case where the UE requests the RRC connection to transmit the SIP-based control signal in order to start the ALL IP service such as VoLTE, this can be rejected if the network, e.g., the base station (i.e., eNodeB), is in a congestion state.

Accordingly, there is a problem in that even a call is dropped in a network congestion state. Details thereof will be described with reference to FIG. 6.

FIG. 6a Shows an Example in Which a UE Rejects an RRC Connection Request in a Congestion Situation of an eNodeB Shown in FIG. 5.

As can be seen from FIG. 6a, in a congestion state of an eNodeB 200, a UE1 100a in an idle state determines originating of a call based on an IMS service, e.g., VoLTE. Likewise, a UE2 200b in an idle data determines originating of normal data.

1) For the originating of the call based on the IMS service, e.g., VoLTE, an upper layer, i.e., a NAS layer, of the UE1 100a sets a value of an establishment cause field to 'Mobile Originating (MO) Data' which implies data of which transmission is initiated by the UE, and transmits a service request message. In addition, for the originating of the normal data, an upper layer, e.g., a NAS layer, of the UE2 100b sets a value of an establishment cause field to 'MO Data' which implies data of which transmission is initiated by the UE, and transmits a service request message.

2) A control signal for originating and terminating the call based on VoLTE uses an SIP-based control signal of IMS, and is transmitted on a user plane. Accordingly, the upper layer, e.g., the NAS layer, of the UE1 100a sets a value of the establishment cause field to 'MO Data', and delivers it to an RRC layer. Then, the RRC layer of the UE1 100a sets the 'MO Data' in the establishment cause field included in the RRC connection request message, and transmits it to the eNodeB 200.

Likewise, the upper layer, i.e., the NAS layer, of the UE2 100b sets the value of the establishment cause field to 'MO Data', and delivers it to the RRC layer. Then, the RRC layer of the UE2 100b sets the 'MO Data' in the establishment cause field included in the RRC connection request message, and transmits it to the eNodeB 200.

3) Then if the eNodeB 200 which is in an overload state receives an RRC connection request message from the UE1 100a and an RRC connection request message from the UE2 100b, respective establishment cause fields are confirmed.

The eNodeB 200 in a congestion state transmits an RRC connection reject message for not only the RRC connection request from the UE2 100b but also the RRC connection request from the UE1 100a, since the establishment cause fields included in the RRC connection request messages from the UE1 100a and the UE2 100b are equally set to MO Data.

Accordingly, there is a problem in that even VoLTE-based call originating is dropped in the congestion state of the eNodeB 200.

FIG. 6b Shows a Terminating Situation of a UE in a Congestion Situation of an eNodeB Shown in FIG. 5.

0) As can be seen from FIG. 6b, in a congestion state or a normal state, an eNodeB 200 transmits a paging signal for terminating of a call based on an IMS service, e.g., VoLTE, to a UE1 100a, and transmits a paging signal for terminating of data to a UE2 100b.

In this case, information for distinguishing whether it is for terminating of the call based on the IMS service, e.g., VoLTE, or for terminating of the data may not be included in the paging signal.

Meanwhile, since the eNodeB 200 cannot distinguish whether the paging signals are for terminating of the call based on the IMS service, e.g., VoLTE, or for terminating of the data, the paging signals transmitted to the UE1 100*a* and the UE2 100*b* cannot be differentiated. In addition, in a congestion situation, the paging signal for terminating of the call based on the IMS service, e.g., VoLTE, may be transmitted later than the paging signal for terminating of the data.

Accordingly, a situation may occur in which the UE1 100*a* transmits the service request (or extended service request) and the RRC connection request message later than the UE 200*b*. As a result, terminating of the call based on the IMS service, e.g., VoLTE, may be delayed.

Figure 7:
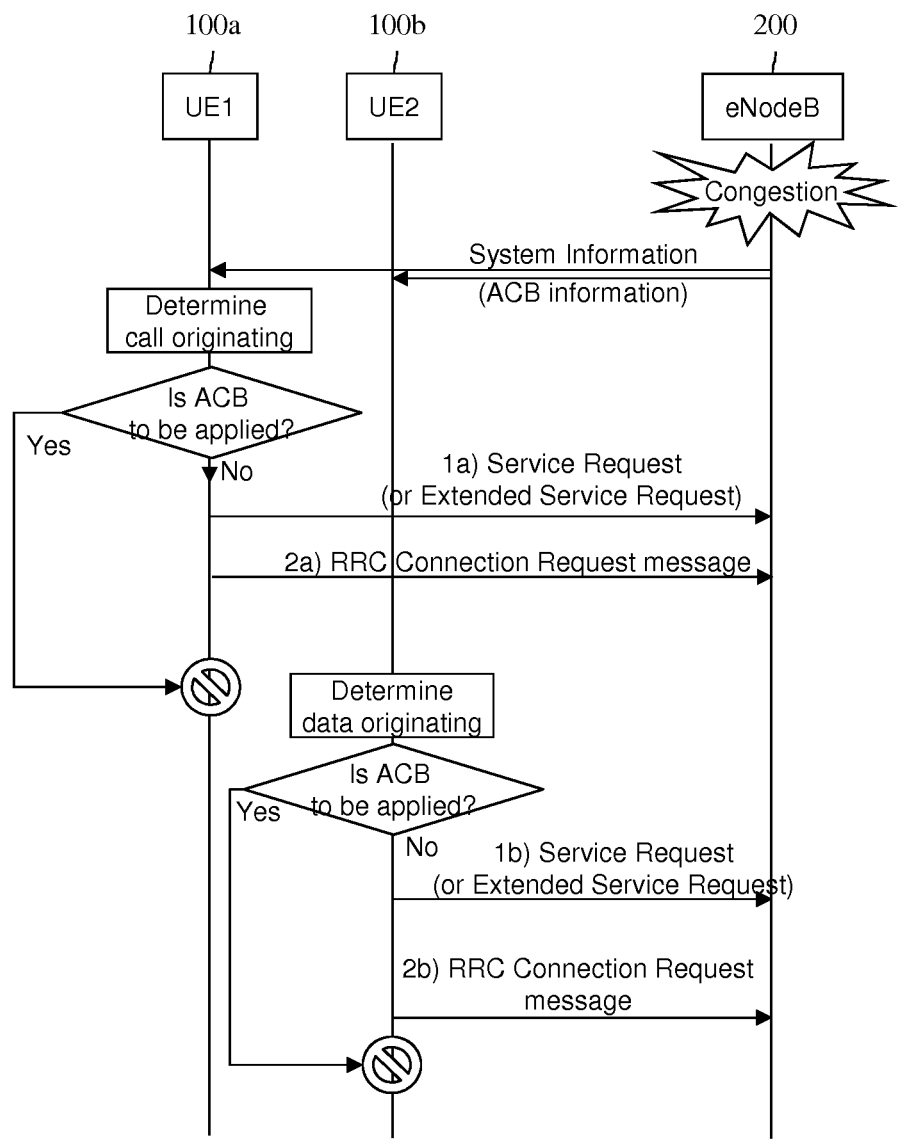
FIG. 7 is an exemplary flowchart showing an operation based on access class barring in a network congestion state.

FIG. 7 is an exemplary flowchart showing an operation based on access class barring in a network congestion state.

Referring to FIG. 7, in an overload or congestion state of a network or an eNodeB 200, the eNodeB 200 may broadcast Access Class Barring (ACB) related information through system information. The system information may be a System Information Block (SIB) type 2.

The SIB type 2 may include ACB related information as shown in Table below.

TABLE 1

| Field | Description |
| --- | --- |
| ac-BarringFactor | If a random value generated by a UE is less than a value caused by ac-BarringFactor, an access is allowed. Otherwise, the access is barred. |
| ac-BarringForCSFB | This is ACB for Circuit Switch (CS) fallback. The CS fallback is for switching a VoLTE call to a previous 3G call. |
| ac-BarringForEmergency | This is ACB for an emergency service. |
| ac-BarringForMO-Data | This is ACB for originating data of the UE. |
| ac-BarringForMO-Signalling | This is ACB for an originating control signal of the UE. |
| ac-BarringForSpecialAC | This is ACB for a specific access class, i.e., 11 to 15. |
| ac-BarringTime | This indicates a time in which an access is barred. |
| ssac-BarringForMMTEL-Video | This is ACB of each service for MMTEL video originating. |
| ssac-BarringForMMTEL-Voice | This is ACB of each service for MMTEL voice originating. |

Meanwhile, the UE1 100*a* determines originating of the call based on the IMS service, e.g., VoLTE, and determines whether the ACB is applied for this. Likewise, the UE2 100*b* determines originating of the normal data, and determines whether the ACB is applied for this.

In general, at least one of 10 access classes (e.g., AC0, AC1, ..., AC9) is randomly allocated in the UE. Exceptionally, the AC10 is allocated for an emergency access. As such, a value of the access class allocated randomly may be stored in each USIM of the UE1 100*a* and the UE2 100*b*.

Then, the UE1 100*a* and the UE2 100*b* check whether access barring is applied by using a barring factor field included in the received ACB related information, on the basis of the stored access class. Such access barring check is performed in respective Access Stratum (AS) layers, i.e., RRC layers, of the UE1 100*a* and the UE2 100*b*.

If the ACB is not applied for this, the UE1 100*a* and the UE2 100*b* may respectively transmit the service request (or extended service request) message and the RRC connection request message.

However, if the ACB is applied for this, both of the UE1 100*a* and the UE2 100*b* cannot transmit the RRC connection request messages.

In summary, there is a problem in that an access is barred since the RRC connection request for originating of the call based on the IMS service, e.g., VoLTE, by the UE1 100*a* and the RRC connection request for originating of the normal data by the UE2 100*b* cannot be distinguished, and thus ACB is applied to both of them.

As described above, since the IMS-based call originating cannot be distinguished from normal data originating in the current 3GPP standard, there is a problem in that the IMS-based call originating fails in a network congestion situation as shown in FIG. 6*a* or it cannot be even attempted as shown in FIG. 7. In addition, such a problem causes a waste of network resources, and deteriorates satisfaction of user experience.

<Solution Proposed in the Present Specification>

According to an aspect of the present specification, a control signal of an IMS-based service (e.g., a VoLTE service), for example, an IMS-based control signal or an SIP-based control signal, may be handled distinctively from normal data even if the control signal is transmitted using a user plane.

More specifically, according to an aspect of the present specification, when the UE intends to perform call originating caused by the IMS-based service, e.g., VoLTE, a NAS layer of the UE sets an establishment cause field to a different value instead of 'MO data' and delivers it to an RRC layer, and the RRC layer of the UE transmits an RRC connection request message according thereto, so that this is not rejected even in a congestion situation of the eNodeB 200.

More specifically, according to an aspect of the present invention, if the UE intends to perform IMS-based call originating (e.g., voice call originating or video call originating), the NAS layer of the UE sets an RRC establishment cause to 'MO-signaling' or a new cause value (e.g., the IMS-based originating or 'MO-IMS MMTEL service') instead of 'MO Data' with respect to a control signal for the IMS-based call originating, e.g., an IMS-based control signal or an SIP-based control signal. In addition, the NAS layer of the UE delivers the set establishment cause to an AS layer, i.e., an RRC layer, so that the RRC layer can transmit an RRC connection request message by using an establishment cause which is set by the NAS layer. Meanwhile, the UE sets a service type (of field) which implies an IMS-based service to a value of IMS Voice, IMS Video, MMTEL over PS Session, or new service type (field), and thereafter transmits the value by setting (including) it in an extended service request message. According to an aspect of the present specification, a control signal for connecting an IMS-based voice call or video call, an IMS-based control signal, or an SIP-based control signal may be transmitted by being included in a new NAS message (e.g., IMS SERVICE REQUEST) other than a normal service request message.

Then, the eNodeB 200 in a congestion or overload state may perform handling different from rejecting of normal data, on the basis of a new cause value or MO-signaling which is set in an RRC establishment cause field of the received RRC connection request message. Even if the eNodeB 200 is not in the congestion or overload state, if the new cause value or the 'MO-signaling' which is set in the RRC establishment cause field of the received RRC connection request message is pre-set, handling may be achieved with a higher priority in comparison with handling of normal data (or handling may be achieved with a lower priority).

In addition, according to an aspect of the present specification, in case of call terminating based on an IMS-based service, i.e., VoLTE, a network node (e.g., S-GW, P-GW) shall report a control signal (e.g., an IMS control signal or an SIP-based control signal) for call terminating based on VoLTE to the MME 510 such that the control signal is distinguished from terminating of normal data. Accordingly, the MME 510 also delivers a paging signal to the UE in a distinguishable manner. Therefore, when the UE creates an RRC connection request message, an establishment cause field may be set to 'MT-access' or a new cause value.

Then, the eNodeB 200 in a congest or overload state may perform handling not through rejection but through acceptance, on the basis of the MT-access or new cause value which is set in the RRC establishment cause field of the received RRC connection request message.

Hereinafter, an example in which the eNodeB 200 performs handling unlike in case of normal data is shown when the 'MO-signaling' or new cause value which is set in the RRC establishment cause field is set.

An RRC connection request message in which 'MO-signaling' or a new cause value is set in an RRC establishment cause field is handled with a higher priority than an RRC connection request which is set to 'MO-Data'.

An RRC connection request message in which 'MO-signaling' or a new cause value is set in an RRC establishment cause field is handled with a higher priority than or with the same priority as an RRC connection request which is set to 'highPriorityAccess'.

An RRC connection request message in which 'MO-signaling' or a new cause value is set in an RRC establishment cause field is handled with a higher priority than or with the same priority as an RRC connection request which is set to 'MT-Access'.

An RRC connection request message in which 'MO-signaling' (for distinguishing an IMS-based service) or a new cause value is set in an RRC establishment cause field is handled with a higher priority than or with the same priority as an RRC connection request which is set to (conventional normal) 'MO-signaling'.

An RRC connection request message in which 'MO-signaling' or a new cause value is set in an RRC establishment cause field is rejected with a lower priority than or with the same priority as an RRC connection request which is set to 'MO-Data'.

An RRC connection request message in which 'MO-signaling' or a new cause value is set in an RRC establishment cause field is rejected with a lower priority than or with the same priority as an RRC connection request which is set to 'highPriorityAccess'.

An RRC connection request message in which 'MO-signaling' or a new cause value is set in an RRC establishment cause field is rejected with a lower priority than or with the same priority as an RRC connection request which is set to 'MT-Access'.

An RRC connection request message in which 'MO-signaling' (for distinguishing an IMS-based service) or a new cause value is set in an RRC establishment cause field is rejected with a higher priority than or with the same priority as an RRC connection request which is set to (conventional normal) 'MO-signaling'.

Meanwhile, differentiating of an IMS-based voice call or video call from normal data may be changed according to an operator's policy, a configuration of a network node (e.g., MME/SGSN, eNodeB), subscriber information, or UE capability.

Meanwhile, an establishment cause value added according to an aspect of the present invention is included in Table described below.

TABLE 2

| Establishment cause | Description |
| --- | --- |
| Emergency | An emergency service is required. |
| HighPriorityAccess | A high priority access is required. |
| MT-Access | An access based on terminating of a UE is required. |
| MO-Signaling | A control signal for originating of the UE with respect to an attach request or a TAU request or an IMS voice/video/MMTEL service. |
| MO-IMS service or MO-IMSMMTEL service or new cause | A control signal for originating of the UE with respect to an IMS service or an IMS-based MMTEL service. |
| MO-IMS Access | Originating of an access for an IMS service. |
| MO-Data | Originating of data by the UE. |

Hereinafter, solutions proposed in the present specification will be described with reference to the accompanying drawings.

Figure 8A:
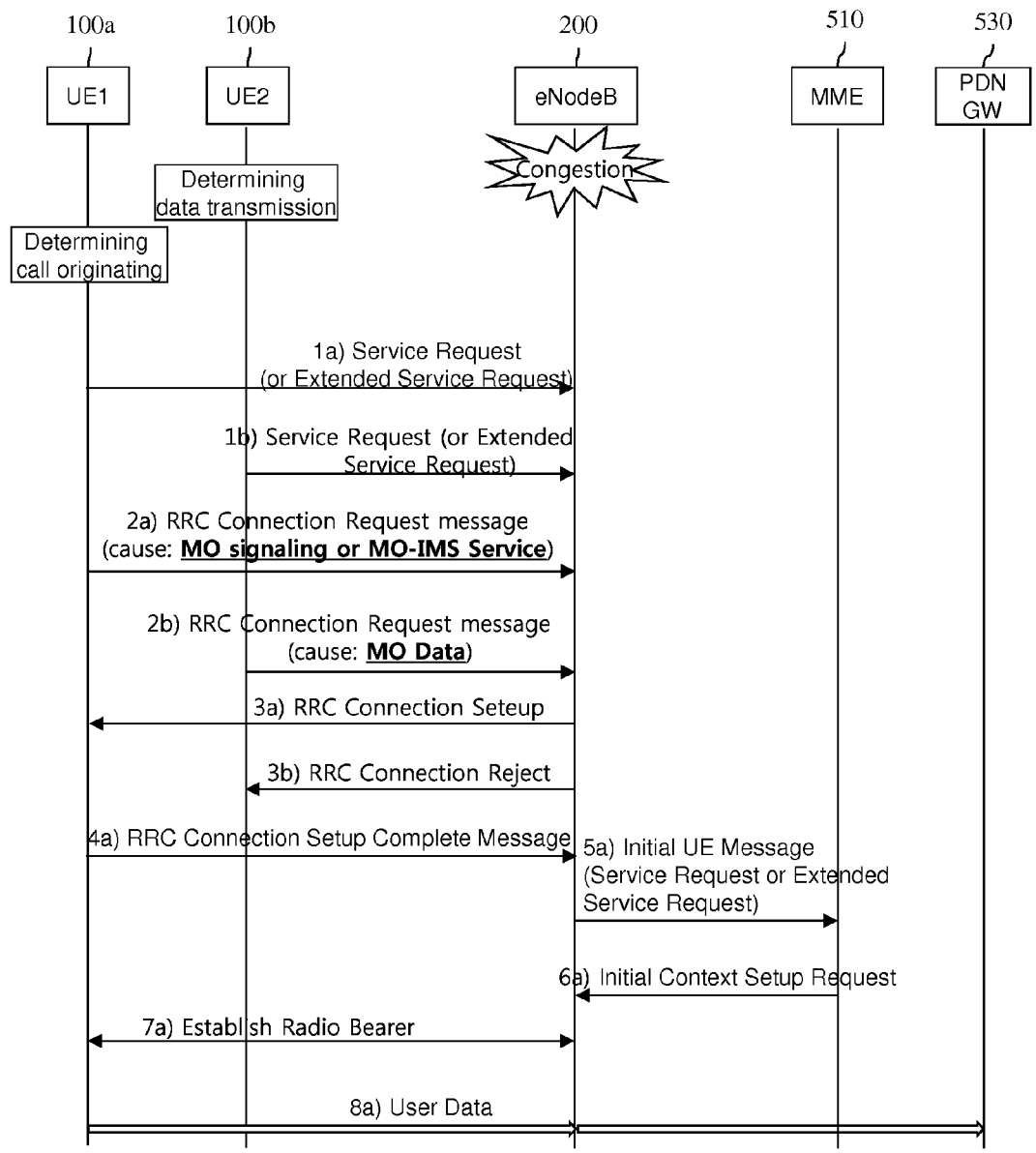

FIG. 8*a* Shows an Exemplary Flow According to a First Aspect of the Present Specification for Solving the Problem of FIG. 6*a*.

As can be seen from FIG. 8*a*, a UE1 100*a* determines originating of an IMS service, e.g., an IMS-based call, and a UE2 100*b* determines originating of data. The IMS-based call may be a voice call, a video call, or an MMTEL-based call.

First, the followings are described with reference to FIG. 8*a*.

1) For an IMS service, e.g., IMS-based call originating, an upper layer, i.e., a NAS layer, of the UE1 100*a* sets a value of an establishment cause field to 'MO-signaling' or a new cause, e.g., 'MO-IMS service' or 'MO-IMS MMTEL service' as shown in Table 2 instead of the existing 'MO-Data'. In addition, the upper layer, e.g., the NAS layer, of the UE1 100*a* transmits a service request or extended service request message including a service type (field) indicating signaling or indicating that it is caused by IMS. That is, the service type (field) indicating the signaling or indicating that it is caused by the IMS may be set to IMS Voice, IMS Video, MMTEL over PS Session, or a new service value.

In addition, for normal data originating, the upper layer, i.e., the NAS layer, of the UE1 100*a* sets a value of an establishment cause field to 'Mobile Originating (MO) Data' which implies data of which transmission is initiated by the UE. In addition, the upper layer, i.e., the NAS layer, of the UE2 100*b* transmits a service request or extended service request message.

2) Subsequently, the upper layer, e.g., the NAS layer, of the UE1 100*a* delivers the set value of the establishment cause field, i.e., 'MO-signaling' or 'MO-IMS service', to the RRC layer. Then, the RRC layer of the UE1 100*a* sets an establishment field in the RRC connection request message according to the delivered value, and transmits it to an eNodeB 200.

Meanwhile, the upper layer, i.e., the NAS layer, of the UE2 100*b* delivers the set value of the establishment field, i.e., 'MO Data', to the RRC layer. Then, the RRC layer of the UE2 100*b* sets the 'MO Data' to the establishment cause field in the RRC connection request message, and transmits it to the eNodeB 200.

3) Then if the eNodeB 200 which is in an overload state receives an RRC connection request message from the UE1

100a and an RRC connection request message from the UE2 100b, respective establishment cause fields are confirmed.

The eNodeB 200 in a congestion state transmits an RRC connection setup message to the UE1 100a instead of rejecting the RRC connection request message from the UE1 100a, since the establishment cause field in the RRC connection request message from the UE1 100a is set to 'MO-signaling' or 'MO-IMS service'.

However, the eNodeB 200 transmits an RRC connection reject message as to the RRC connection request from the UE2 100b, since the establishment cause field in the RRC connection request message from the UE2 100b is set to 'MO Data'.

4) Upon receiving the RRC connection setup message, the UE1 100a delivers an RRC connection setup complete message to the eNodeB 200.

5 to 7) The eNodeB 200 delivers an initial UE message to an MME 510 by including a service request message or an extended service request message. Then, the MME 510 delivers an initial context setup request message to the eNodeB 200. Then, the eNodeB 200 establishes a radio bearer with respect to the UE1 100a.

8) Finally, the UE1 100a can transmit user data based on the IMS service, e.g., the IMS-based call.

On the other hand, although FIG. 8a shows an example in which the UE1 100a attempts the IMS-based call originating and the UE2 200b attempts normal data originating, such an example is also applicable to a case where one UE attempts the IMS-based call originating and the normal data originating simultaneously.

Meanwhile, the method in which the UE1 100a differently sets the establishment cause field according to whether it is the IMS-caused call originating or the normal data originating may be applied or not applied according to an operator's policy, a configuration of a network node (e.g., MME, eNodeB), subscriber information, or UE capability. In addition, this may be applied only to a situation in which a congestion or an overload occurs in the network node (e.g., MME, eNodeB). Alternatively, the UE reports capability information or support enable/disable information to a network through Attach/Tracking Area Update (TAU)/Routing Area Update (RAU), or the like, and thereafter the network may determine whether to apply the method. Whether to apply the method by the network may be provided to NAS configuration Management Object (MO, see 3GPP TS 24.368) through OMA-DM. Accordingly, such a configuration method may be applied by being changed statically or dynamically.

On the other hand, it is shown in FIG. 8a that 'MO-signaling' or 'MO-IMS service' is set in an establishment cause field. However, 'MO-IMS Access', 'MO-IMS MMTEL service' or a value indicating a new cause may be included in the establishment cause field.

Figure 8B:
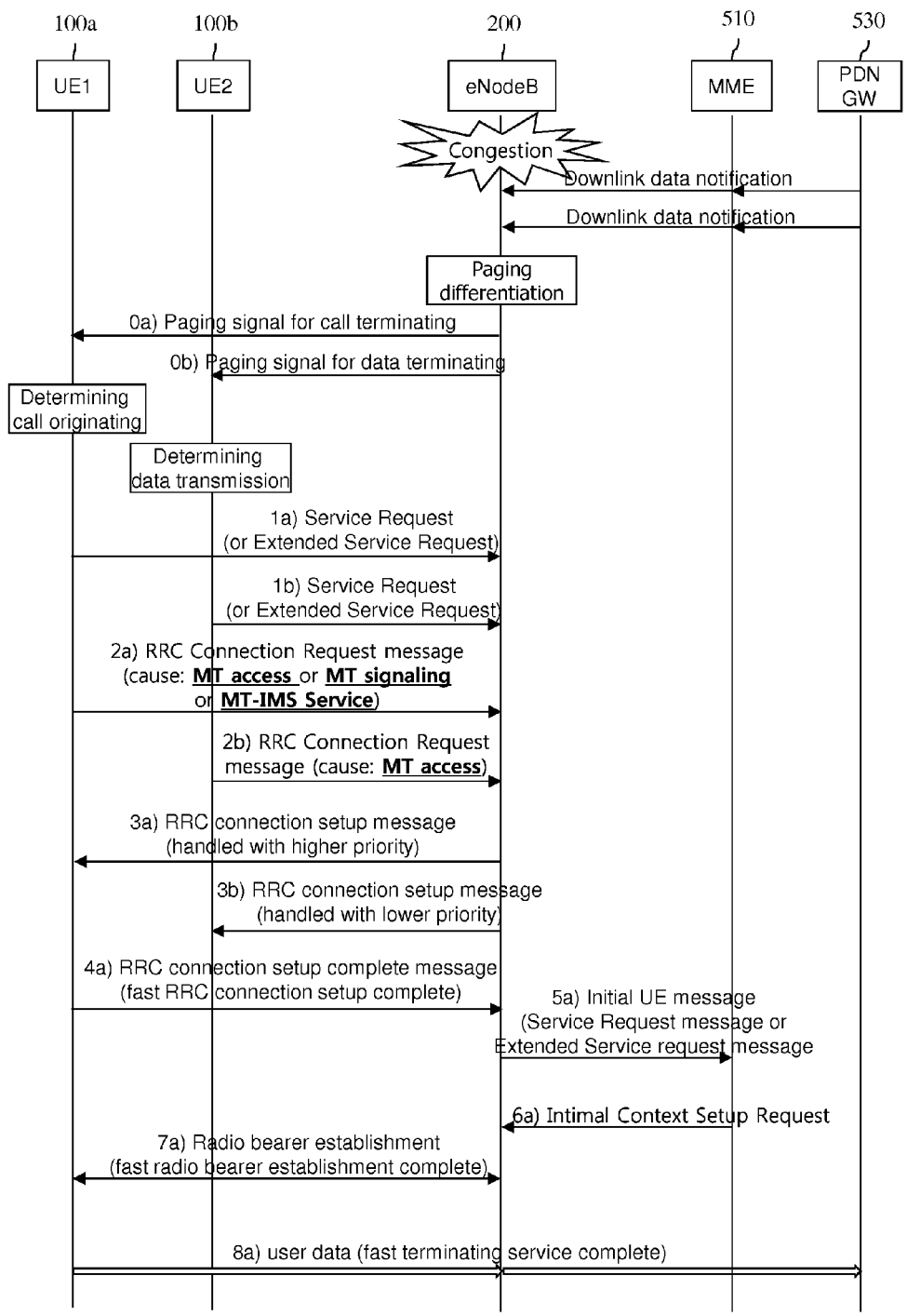
FIG. 8b shows an exemplary flow according to a first aspect of the present specification for solving a problem in a terminating situation of FIG. 6b.

FIG. 8b Shows an Exemplary Flow According to a First Aspect of the Present Specification for Solving a Problem in a Terminating Situation of FIG. 6b.

First, a PDN GW 530 transmits a notification on downlink data for reporting an IMS service for a UE1 100a, e.g., VoLTE-based call terminating, to an eNodeB 200 through an MME 510, and also transmits a notification on downlink data for reporting normal data terminating for a UE2 100b to the eNodeB 200 through the MME 510.

Meanwhile, the PDN GW 530 determines whether a control signal for call terminating is an IMS-based control signal or an SIP-based control signal or a normal control signal, and reports the result to the MME 510. Likewise, the MME 510 determines whether the control signal for call terminating is the IMS-based control signal or the SIP-based control signal or the normal control signal, and reports the result to the eNodeB 200. In this case, the distinguishing of whether the control signal is the IMS-based control or the SIP-based control signal may be possible by using information indicating whether it is an IMS session or not. The information may be a factor (or indicator) included in the existing control message or a factor (or indicator) included in a new control message. The factor (or indicator) is transmitted from the PDN GW 530 or the S-GW to the MME 510 through the control message, and the MME 510 recognizes the factor (or indicator), and transmits a paging signal to the eNodeB 200 by including the IMS-based control signal or the SIP-based control signal. Meanwhile, according to information added to the paging signal, the UE1 100a may set a value indicating 'MT-access' or 'MT-IMS Access' or 'MT-signaling' or 'MT-IMS Service' or a value indicating a new cause in the establishment cause field.

Accordingly, the eNodeB 200 in a congestion state may differentiate the paging signal. For example, the eNodeB 200 may preferentially handle a paging signal for an IMS service, e.g., VoLTE-based call terminating, in comparison with a paging signal for reporting normal data terminating.

In addition, when transmitting the paging service for the IMS service, e.g., VoLTE-based call terminating, to the UE1 100a in an idle state, the eNodeB 200 in the congestion state transmits the paging signal by including the aforementioned information. In this case, the eNodeB 200 may transmit the paging signal on the basis of the information, a network congestion situation, an operator policy, UE capability, etc. For example, even if the eNodeB 200 determines not to transmit a normal paging signal due to a network congestion, when the information is received, it may be determined to transmit the paging signal for the UE1 100a.

However, the eNodeB 200 transmits a simple paging signal to the UE2 100b. The paging signal to be transmitted to the UE2 100b may be transmitted in a broadcasting manner. However, the paging signal to be transmitted to the UE1 100a may be transmitted in a broadcasting manner, or may be transmitted through a new dedicated channel.

As such, the paging signal for the IMS-based service may be provided to the UE1 100a through differentiation. The differentiation of the paging signal may imply that a paging signal for reporting a connection of the IMS-based service is handled with a higher priority in comparison with a paging signal for reporting a reception of normal data.

A method of differentiating the paging signal for the IMS-based service may be applied or not applied according to an operator's policy, a configuration of a network node (e.g., MME, eNodeB), subscriber information, or UE capability. In addition, this may be applied only to a situation in which a congestion or an overload occurs in the network node (e.g., MME, eNodeB). The UE reports UE's support enable/disable information or capability information to a network through Attach/TAU/RAU, or the like, and thereafter the network may determine whether to apply the method. Whether to apply the method by the network may be provided to NAS configuration Management Object (MO, see 3GPP TS 24.368) through OMA-DM. Accordingly, such a configuration method may be applied by being changed statically or dynamically.

Hereinafter, an establishment cause included in an attach request message, detach request message, TAU request message, and service request message transmitted by a UE will be described.

When a NAS connection establishment is requested, the establishment cause used by a UE's higher layer and NAS layer may be selected according to each procedure shown in the following table. The NAS layer may indicate a type related to an RRC establishment cause to a lower layer and an RRC layer for the purpose of an access control. If Extended Access Barring (EAB) is configured, the higher layer of the UE may report to the lower layer that the EAB is applied for a request other than the following cases.

When the UE attempts an access by using one of classes 11 to 15.

When the UE responds to a paging signal.

When an RRC establishment cause is an emergency call.

When the UE is configured to override EAB.

TABLE 3

| NAS procedure | Establishment cause | Type |
|---|---|---|
| Attach procedure | If an attach request message has an EPS attach type which is not set to an EPS emergency attach, an RRC establishment cause is set to MO-signaling. | Signaling initiated by a UE (originating signaling) |
| | If an attach request message has an EPS attach type which is set to an EPS emergency attach, an RRC establishment cause is set to an emergency call. | Emergency call |
| Tracking Area Update | If the UE does not have a PDN connection established for an emergency bearer service and does not initiate a PDN connection request having a request type which is set to an emergency, an establishment cause of an RRC connection request is set to MO-signaling. | Signaling initiated by the UE (originating signaling) |
| Service Request | If a service request message or an extended service request message (or a new NAS message) has a service type which is set to "mobile originating IMS Voice/Video/MMTEL over PS Session" and requests a transmission for an IMS Voice/Video/MMTEL service on a PS session, an RRC establishment cause is set to MO-signaling or a new cause value, e.g., an MO-IMS service or an IMS MMTEL service or the like. | Signaling initiated by the UE (originating signaling) |
| | If a service request message or an extended service request message is transmitted in response to a paging signal for the IMS Voice/Video/MMTEL service over the PS session, and has a service type which is set to "mobile terminating IMS Voice/Video/MMTEL over PS Session", an RRC establishment cause is set to an MT access. | Terminating calls of the UE |
| | If a service request message or an extended service request message includes device properties having a low priority indicator which is set to "MS is not configured to NAS signaling low priority", has a service type which is set to "mobile originating IMS Voice/Video/MMTEL over PS Session", and requests a transmission for an IMS Voice/Video/MMTEL service on a PS session, an RRC establishment cause may be set to MO-signaling or a new cause (e.g., MO-IMS service or IMS MMTEL service). | Originating calls of the UE |

Although not shown in Table above, a service type of the service request message or extended service request message may be set to any one of "mobile originating IMS Voice", "mobile originating IMS Video", "mobile originating IMS MMTEL over PS Session". In this case, each (individual) type may be set/mapped to "originating calls". Alternatively, the service type of the service request message or extended service request message may be set in a form of "mobile originating IMS Voice/Video/MMTEL over PS Session".

Likewise, the service type of the service request message or extended service request message may be set to any one of "mobile terminating IMS Voice", "mobile terminating IMS Video", "mobile terminating IMS MMTEL over PS Session". In this case, each (individual) type may be set/mapped to "terminating calls". Alternatively, a service type of the service request message or the extended service request message may be set in a form of "mobile terminating IMS Voice/Video/MMTEL over PS Session".

On the other hand, a method of setting MO-signaling or MO-IMS service or the like as an establishment cause in the service request message or the extended service request message may also be used by a UE having a low priority or a normal priority.

If the UE assigned to the low priority requests a transmission for the IMS-based service by being changed to the normal priority, not the low priority, at a request of an application, UE capability, an operator's policy, or a request of a network, then an extended service request message including an IE which is set to the normal priority, not the low priority, may be transmitted to a network node (e.g., MME). In this case, a NAS layer of the UE may transmit an extended service request message in which an establishment cause is set to 'MO-signaling' or a new cause value (e.g., MO-IMS access or MO-IMS MMTEL service). In addition, an RRC layer of the UE may transmit an RRC connection request message in which an establishment cause is set to 'MO-signaling' or a new cause value (e.g., MO-IMS access or MO-IMS MMTEL access).

Then, the eNodeB 200 may perform handling by differentiating a connection for an MO-IMS service (in particular, voice call, video call), on the basis of the 'MO-signaling' or new cause value which is set in the establishment cause of the received RRC connection request message.

Figure 9:
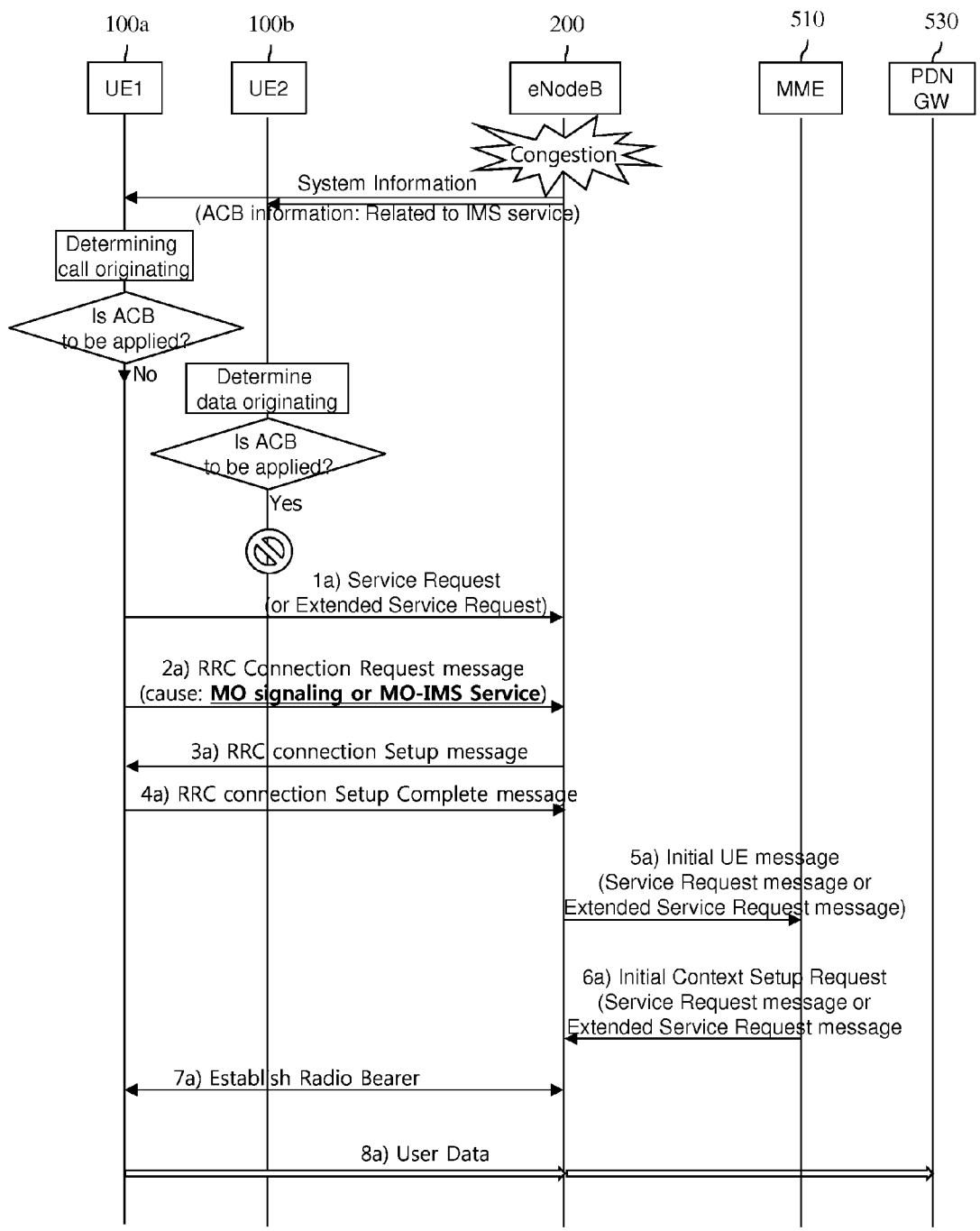
FIG. 9 shows an exemplary flow according to a second aspect of the present specification for solving a problem of FIG. 7.

FIG. 9 Shows an Exemplary Flow According to a Second Aspect of the Present Specification for Solving the Problem of FIG. 7.

As can be seen from FIG. 9, according to a second aspect of the present specification, in order to differentiate an IMS-based control signal for connecting an IMS-based service, an eNodeB 200 may broadcast system information including Access Class Barring (ACB) information which includes an exception rule for MO-signaling or a new cause (e.g., MO-IMS service or IMS MMTEL service) among establishment causes.

Then, a UE1 100*a* which desires IMS-based call originating and a UE2 100*b* which desires normal data originating may determine whether to apply ACB, on the basis of the ACB information including the exception rule.

That is, the UE1 100*a* does not check whether to apply ACB to MO-Data which is an establishment cause conventionally used for an IMS-based control signal (signaling) or SIP-based control signal for connecting an IMS-based service (e.g., an IMS-based voice call, video call), and instead, checks whether to apply ACB on the basis of an establishment cause which is set according to an aspect of the present specification, that is, MO-signaling or a new cause (e.g., MO-IMS service or IMS MMTEL service). Since the received Access Class Barring (ACB) information includes an exception for MO-signaling or a new cause (e.g., MO-IMS service or IMS MMTEL service) among the establishment causes, the UE1 100*a* determines that the RRC connection request is not applied to the ACB. Therefore, the UE1 100*a* may transmit the RRC connection request.

In doing so, the RRC request message for carrying an SIP-based control signal of an IMS-based control signal (signaling) for connecting the IMS-based service (e.g., an IMS-based voice call, video call) may not be rejected by the eNodeB 200 but be normally handled.

The following table shows ACB information including an exception rule for MO-signaling or a new cause (e.g., MO-IMS service or IMS MMTEL service) among establishment causes according to a second aspect of the present specification.

TABLE 4

| Field | Description |
|---|---|
| ac-BarringFactor | If a random value created by a UE is less than a value caused by ac-BarringFactor, an access is allowed. Otherwise, the access is barred. |
| ac-BarringForCSFB | This is ACB for Circuit Switch (CS) fallback. The CS fallback is for switching a VoLTE call to a previous 3G call. |
| ac-BarringForEmergency | This is ACB for an emergency service. |
| ac-BarringForMO-Data | This is ACB for originating data of the UE. |
| ac-BarringForMO-Signalling | This is ACB for originating control signal (signaling) of the UE or for signaling for originating of an IMS service. |
| ac-BarringFor MO-IMS service or IMS MMTEL service or new cause | This is ACB for signaling for originating of the IMS service. |
| ac-BarringForSpecialAC | This is special access class, that is, ACB for 11 to 15. |
| ac-BarringTime | This indicates access barring time. |
| ssac-BarringForMMTEL-Video | This is ACB of each service for MMTEL video originating. |
| ssac-BarringForMMTEL-Voice | This is ACB of each service for MMTEL voice originating. |

The first aspect and the second aspect of the present specification are described above. Although not described specifically, those ordinarily skilled in the art can clearly know that those aspects can be combined.

Hereinafter, the aspects of the present specification are described again in summary.

If a UE 100 determines that a connection of an IMS-based service (e.g., IMS-based voice call, video call) is necessary, a NAS layer of the UE sets a value of an establishment cause field to 'MO-signaling' or a new cause (e.g. 'MO-IMS service', 'MO-IMMS MMTEL service' or 'MO-IMS Access') as shown in Table 2, instead of the existing 'MO-Data'. Thereafter, the NAS layer of the UE transmits a service request or extended service request message. Subsequently, the NAS layer of the UE delivers the set establishment cause to an RRC layer. The RRC layer of the UE sets the delivered establishment cause in an RRC request message for carrying an SIP-based control signal or an IMS-based control signal (signaling) for connecting an IMS-based service (e.g., IMS-based voice call, video call), and transmits it to the eNodeB 200.

Meanwhile, as a value of an establishment cause that can be used for an RRC request message for carrying a control signal for connecting an IMS-based service, i.e., an IMS-based control signal (signaling), or an SIP-based control signal, the eNodeB 200 may deliver information on 'MO-signaling' or a new cause (e.g., 'MO-IMS service', 'MO-IMS MMTEL service', or 'MO-IMS Access') as shown in Table 2 to the UE 100.

Further, upon receiving a service request message or an extended service request or RRC connection request message including 'MO-signaling' or a new cause (e.g., 'MO-IMS service', 'MO-IMS MMTEL service', or 'MO-IMS Access'), the eNodeB 200 may handle this by differentiating from a request message including an establishment cause which is set to 'MO Data' in a congestion state or an overload state.

The content described up to now can be implemented in hardware. This will be described with reference to FIG. 10.

Figure 10:
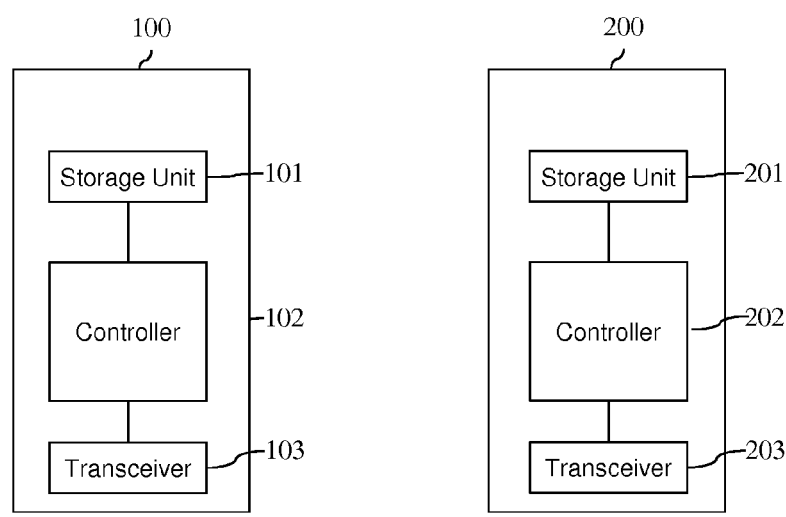
FIG. 10 is a block diagram of a UE 100 and an eNodeB 200 according to an embodiment of the present invention.

FIG. 10 is a Block Diagram of a UE 100 and an eNodeB 200 According to an Embodiment of the Present Invention.

Referring to FIG. 10, the UE 100 includes a storage unit 101, a controller 102, and a transceiver 103. Further, the eNodeB 200 includes a storage unit 201, a controller 202, and a transceiver 203.

The storage units 101 and 201 store the methods of FIG. 5 to FIG. 9.

The controllers 102 and 202 control the storage units 101 and 201 and the transceivers 103 and 203. More specifically, the controllers 102 and 202 respectively perform the methods stored in the storage units 101 and 201. The controllers 102 and 202 transmit the aforementioned signals via the transceivers 103 and 203.

Although exemplary embodiments of the present invention have been described above, the scope of the present invention is not limited to the specific embodiments and the present invention may be modified, changed, or improved in various ways within the scope of the present invention and the category of the claims.

What is claimed is:

1. A method for transmitting a Radio Resource Control (RRC) connection request message, the method comprising:
   receiving system information from a base station, the system information including an exception rule for an access class barring;
   determining whether to transmit the RRC connection request message according to the access class barring information,
   wherein if the RRC connection request message is related to a specific multimedia telephony (MMTEL) service and if the exception rule is related to the specific MMTEL service, determining that the RRC connection request message is not barred and transmitting the RRC connection request message; and
   if there is a need to connect an Internet Protocol Multimedia Subsystem (IMS) based service, setting a cause value indicating that it is caused by IMS, in an establishment cause field of the RRC connection request message.

2. The method of claim 1, wherein the specific MMTEL service corresponds to at least one of a MMTEL voice and MMTEL video.

3. The method of claim 1, further comprising:
   transmitting to the base station a service request or extended service request message of a Non-Access Stratum (NAS) layer including a service type (field) indicating signaling or indicating that it is caused by IMS.

4. The method of claim 1, wherein the RRC connection request message includes the set establishment cause field.

5. The method of claim 1, wherein in the establishment cause field, the cause value which implies signaling or implies that it is caused by IMS is set, instead of a cause value which implies a transmission of normal data.

6. The method of claim 1, wherein transmitting the RRC connection request message comprises:
   delivering, by a NAS layer of the terminal, the set cause value to an RRC layer of the terminal;

setting, by the RRC layer of the terminal, a cause field of an RRC connection request message on the basis of the set cause value; and transmitting the RRC connection request message including the set cause field.

7. The method of claim 1, wherein if the IMS-based service is initiated by the terminal, the cause value corresponds to any one of Mobile Originating signaling (MO-signaling), an MO-IMS service, an MO-IMS access, an MO-IMS MMTEL service, and a new cause value.

8. The method of claim 1, further comprising:
receiving information regarding cause values related to the IMS-based service from the base station, wherein in the setting of the establishment cause field, one of the cause values is selected.

9. A terminal for transmitting a Radio Resource Control (RRC) connection request message, the terminal comprising:
a transceiver configured to receive system information from a base station, the system information including an exception rule for an access class barring; and
a controller configured to determine whether to transmit the RRC connection request message according to the access class barring information,
wherein if the RRC connection request message is related to a specific multimedia telephony (MMTEL) service and if the exception rule is related to the specific MMTEL service, the controller determines that the RRC connection request message is not barred and causes the RRC connection request message to be transmitted, and
wherein if there is a need to connect an Internet Protocol Multimedia Subsystem (IMS) based service, the controller is further configured to set a cause value, signaling or indicating that it is caused by IMS, in an establishment cause field of the RRC connection request message.

10. The terminal of claim 9, wherein the specific MMTEL service corresponds to at least one of a MMTEL voice and MMTEL video.

* * * * *